US009357523B2

(12) United States Patent
Kakinada et al.

(10) Patent No.: US 9,357,523 B2
(45) Date of Patent: May 31, 2016

(54) PAGING OPTIMIZATION IN SMALL CELL NETWORKS USING GATEWAYS (71) Applicant: Nokia Siemens Networks Oy, Espoo (FI)

(72) Inventors: Umamaheswar Kakinada, Carpentersville, IL (US); Vishnu O V Ram, Bangalore (IN); Joseph Thaliath, Bangalore (IN); Dipu Karuthedathu, Bangalore (IN); Sagar Kiritkumar Parmar, Naranpura (IN); Gayatri Ve, Bangalore (IN); Rahul Ramachandran, Bangalore (IN)

(73) Assignee: Nokia Solutions and Networks Oy, Espoo (FI)

( * ) Notice: Subject to any disclaimer, the term of this patent is extended or adjusted under 35 U.S.C. 154(b) by 0 days.

(21) Appl. No.: 14/051,691

(22) Filed: Oct. 11, 2013

(65) Prior Publication Data

US 2014/0106790 A1  Apr. 17, 2014

(30) Foreign Application Priority Data

Oct. 12, 2012 (IN) ............................ 3201/DEL/2012

(51) Int. Cl.
*H04W 76/02* (2009.01)
*H04W 68/02* (2009.01)
(Continued)

(52) U.S. Cl.
CPC .............. *H04W 68/02* (2013.01); *H04W 68/04* (2013.01); *H04W 84/045* (2013.01)

(58) Field of Classification Search
CPC ....... H04W 68/00; H04W 4/00; H04W 76/02; H04W 24/00; H04W 40/02; H04W 36/00; H04W 4/22; H04W 72/00; H04W 12/06; H04W 36/16; H04W 4/06; H04W 60/00; H04W 88/02; H04W 24/04; H04W 8/005; H04W 68/02; H04W 68/04; H04W 84/045

USPC ........ 455/458, 426.1, 415, 515, 456.5, 456.1, 455/456.2

See application file for complete search history.

(56) References Cited

U.S. PATENT DOCUMENTS

2011/0143783 A1* 6/2011 Lee et al. ....................... 455/458
2012/0270570 A1* 10/2012 Claes .................... H04W 8/005
455/456.5

(Continued)

FOREIGN PATENT DOCUMENTS

EP          2 254 378 A1     11/2010
FR       EP 2254378 A1  *  11/2010 ............ H04W 68/04

OTHER PUBLICATIONS

Hui Song et al: "Mobility Management"; In: "Femtocells", Nov. 3, 2009, John Wiley & Sons, Ltd, Chichester, UK, XP55042406, (pp. 179-224).

(Continued)

*Primary Examiner* — Inder Mehra
(74) *Attorney, Agent, or Firm* — Harrington & Smith (57) ABSTRACT A method includes receiving from a core network entity a paging message including a permanent user identity of a user for a specific user equipment, and determining, using the permanent user identity, a set of small cells to which the paging message should be sent based on a small cell last visited by the specific user equipment and small cells that are neighbors to the last-visited small cell. The paging message, without the permanent user identity, is sent to the determined set of small cells. Another method includes, responsive to determining a paging message for a specific user equipment is to be communicated toward the specific user equipment, determining whether a gateway can receive paging messages comprising a permanent user identity and a temporary user identity, and responsive thereto, sending the paging message for the specific user equipment to the gateway. Apparatus and computer program products are also disclosed.

22 Claims, 7 Drawing Sheets (51) Int. Cl.
*H04W 24/00* (2009.01)
*H04W 68/04* (2009.01)
*H04W 84/04* (2009.01)

(56) References Cited

U.S. PATENT DOCUMENTS

| | | | | |
|---|---|---|---|---|
| 2013/0035066 | A1* | 2/2013 | Nylander et al. | 455/411 |
| 2013/0155948 | A1* | 6/2013 | Pinheiro et al. | 370/328 |
| 2013/0189997 | A1* | 7/2013 | Urie | 455/444 |
| 2014/0376492 | A1* | 12/2014 | Zisimopoulos et al. | 370/329 |

OTHER PUBLICATIONS

3GPP TS 36.300 V10.7.0 (Mar. 2012); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 10), (194 pages).

3GPP TS 36.300 V11.1.0 (Mar. 2012); 3rd Generation Partnership Project; Technical Specification Group Radio Access Network; Evolved Universal Terrestrial Radio Access (E-UTRA) and Evolved Universal Terrestrial Radio Access Network (E-UTRAN); Overall description; Stage 2 (Release 11), (194 pages).

3GPP TS 22.220 V11.5.0 (Jun. 2012); 3rd Generation Partnership Project; Technical Specification Group Services and System Aspects; Service requirements for Home Node B (HNB) and Home eNode B (HeNB) (Release 11), (25 pages).

3GPP TS 24.301 V10.8.0 (Sep. 2012); 3rd Generation Partnership Project; Technical Specification Group Core Network and Terminals; Non-Access-Stratum (NAS) protocol for Evolved Packet System (EPS); Stage 3 (Release 10), (322 pages).

3GPP TS 23.060 V11.3.0 (Sep. 2012); 3rd Generation Partnership Project; Technical Specification Group Services and System Aspects; General Packet Radio Service (GPRS); Service description; Stage 2 (Release 11), (333 pages).

3GPP TR 21.905 V11.1.0 (Jun. 2012); 3rd Generation Partnership Project; Technical Specification Group Services and System Aspects; Vocabulary for 3GPP Specifications (Release 11), (64 pages).

3GPP R3-092846; 3GPP TSG-RAN3 Meeting #66; CATT; "Support for routing of inbound handover"; Jeju, korea , Nov. 9-13, 2009, (9 pages).

\* cited by examiner

PAGING OPTIMIZATION IN SMALL CELL NETWORKS USING GATEWAYS

TECHNICAL FIELD

This invention relates generally to wireless networks and, more specifically, relates to paging user equipment in wireless networks with gateways connected to multiple small cells.

BACKGROUND

This section is intended to provide a background or context to the invention disclosed below. The description herein may include concepts that could be pursued, but are not necessarily ones that have been previously conceived, implemented or described. Therefore, unless otherwise explicitly indicated herein, what is described in this section is not prior art to the description in this application and is not admitted to be prior art by inclusion in this section. Abbreviations that may be found in the specification and/or the drawing figures are defined below at the end of the specification but prior to the claims.

Wireless traffic volumes are dramatically outstripping macro cellular capability. Having multiple smaller cell coverage areas (such as femto or similar cells used in, e.g., a customer's premises, commonly created by an HeNB) controlled by a single controller (such as a home eNB Gateway) is anticipated to be a potential solution to this problem. For instance, a macro cell might provide coverage over a larger area, where there are multiple cells formed by HeNBs under this larger coverage area. The HeNBs might be controlled by the HeNB GW. In this manner, users within the smaller cells share data resources amongst a smaller set of users and typically the HetNet configuration can provide higher capacity and a faster network overall.

However, when there are many HeNBs in an area or otherwise connected to a single HeNB GW, there can be problems in certain instances. For instance, paging can be problematic for an idle UE, as an HeNB GW has to send a paging messages to all HeNBs which match the tracking area and CSG, which could be a large number of HeNBs.

SUMMARY

This section contains examples of possible implementations and is not meant to be limiting.

In an exemplary embodiment, a method is disclosed that includes: receiving from a core network entity a paging message for a specific user equipment, the paging message comprising a permanent user identity of a user corresponding to the specific user equipment; determining, using the permanent user identity, a set of small cells to which the paging message should be sent based on a small cell last visited by the specific user equipment and small cells that are neighbors to the last-visited small cell; and sending the paging message, without the permanent user identity, to the determined set of small cells.

A further exemplary embodiment is a computer program product comprising program code for executing the method of the previous paragraph. Another exemplary embodiment is the computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: receiving from a core network entity a paging message for a specific user equipment, the paging message comprising a permanent user identity of a user corresponding to the specific user equipment; determining, using the permanent user identity, a set of small cells to which the paging message should be sent based on a small cell last visited by the specific user equipment and small cells that are neighbors to the last-visited small cell; and sending the paging message, without the permanent user identity, to the determined set of small cells.

An exemplary computer program product includes a computer-readable medium bearing computer program code embodied therein for use with a computer, the computer program code including: code for receiving from a core network entity a paging message for a specific user equipment, the paging message comprising a permanent user identity of a user corresponding to the specific user equipment; code for determining, using the permanent user identity, a set of small cells to which the paging message should be sent based on a small cell last visited by the specific user equipment and small cells that are neighbors to the last-visited small cell; and code for sending the paging message, without the permanent user identity, to the determined set of small cells.

A further exemplary embodiment is an apparatus, comprising: means for receiving from a core network entity a paging message for a specific user equipment, the paging message comprising a permanent user identity of a user corresponding to the specific user equipment; means for determining, using the permanent user identity, a set of small cells to which the paging message should be sent based on a small cell last visited by the specific user equipment and small cells that are neighbors to the last-visited small cell; and means for sending the paging message, without the permanent user identity, to the determined set of small cells.

An additional exemplary embodiment is method comprising: responsive to determining a paging message for a specific user equipment is to be communicated toward the specific user equipment, performing at least the following: determining whether a gateway, able to access a plurality of small cells, can receive paging messages comprising a permanent user identity and a temporary user identity of a user equipment; and responsive to determining the gateway can receive paging messages comprising the permanent user identity and temporary user identity, sending the paging message for the specific user equipment to the gateway, where the paging message comprises the permanent user identity and temporary user identity of corresponding to the specific user equipment.

A further exemplary embodiment is a computer program product comprising program code for executing the method of the previous paragraph. Another exemplary embodiment is the computer program according to this paragraph, wherein the computer program is a computer program product comprising a computer-readable medium bearing computer program code embodied therein for use with a computer.

An exemplary apparatus includes one or more processors and one or more memories including computer program code. The one or more memories and the computer program code are configured to, with the one or more processors, cause the apparatus to perform at least the following: responsive to determining a paging message for a specific user equipment is to be communicated toward the specific user equipment, performing at least the following: determining whether a gateway, able to access a plurality of small cells, can receive paging messages comprising a permanent user identity and a temporary user identity of a user equipment; and responsive to determining the gateway can receive paging messages comprising the permanent user identity and temporary user identity, sending the paging message for the specific user equipment to the gateway, where the paging message comprises the permanent user identity and temporary user identity of corresponding to the specific user equipment.

An exemplary computer program product includes a computer-readable medium bearing computer program code embodied therein for use with a computer, the computer program code including: code, responsive to determining a paging message for a specific user equipment is to be communicated toward the specific user equipment, for performing at least the following: determining whether a gateway, able to access a plurality of small cells, can receive paging messages comprising a permanent user identity and a temporary user identity of a user equipment; and responsive to determining the gateway can receive paging messages comprising the permanent user identity and temporary user identity, sending the paging message for the specific user equipment to the gateway, where the paging message comprises the permanent user identity and temporary user identity of corresponding to the specific user equipment.

In yet another exemplary embodiment, an apparatus is disclosed that includes: means, responsive to determining a paging message for a specific user equipment is to be communicated toward the specific user equipment, for performing at least the following: determining whether a gateway, able to access a plurality of small cells, can receive paging messages comprising a permanent user identity and a temporary user identity of a user equipment; and responsive to determining the gateway can receive paging messages comprising the permanent user identity and temporary user identity, sending the paging message for the specific user equipment to the gateway, where the paging message comprises the permanent user identity and temporary user identity of corresponding to the specific user equipment.

DETAILED DESCRIPTION OF THE DRAWINGS

Figure 1A:
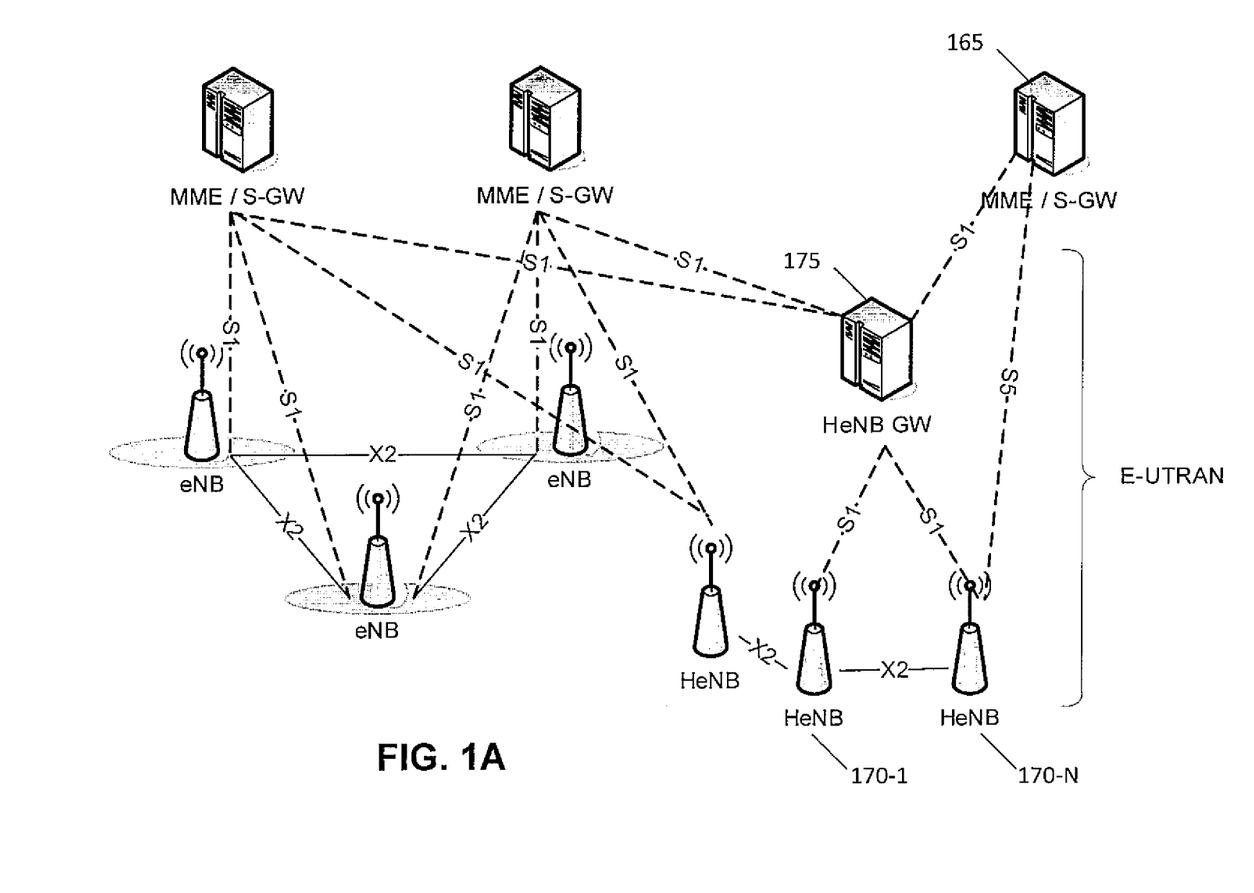
FIG. 1A illustrates an exemplary system in which the exemplary embodiments of the instant invention may be practiced and is a modified version of "Figure 4.6.1-2: Overall E-UTRAN Architecture with deployed HeNB GW", from 3GPP TS 36.300 V10.7.0 (2012-03)
Figure 1B:
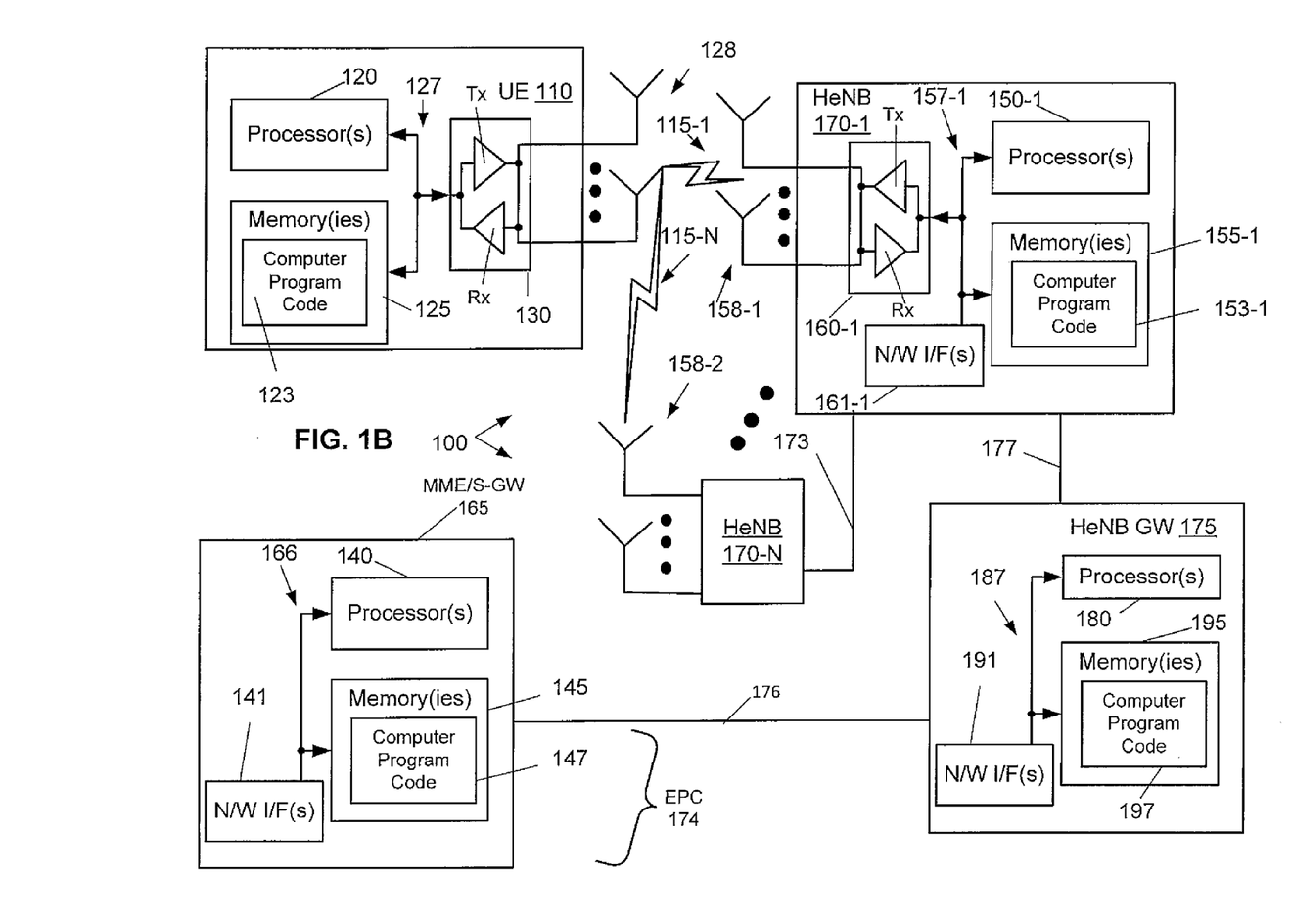
FIG. 1B illustrates an exemplary system in which the exemplary embodiments of the instant invention may be practiced.

Before proceeding with additional description of problems associated with paging in femto networks, reference is made to FIGS. 1A and 1B, which illustrate an exemplary system in which the exemplary embodiments of the instant invention may be practiced. FIG. 1A is a modified version of "Figure 4.6.1-2: Overall E-UTRAN Architecture with deployed HeNB GW", from 3GPP TS 36.300 V10.7.0 (2012-03). HeNBs 170-1 and 170-N are connected via an S1 interface with an HeNB GW 175, and the HeNB GW 175 is connected to an MME 165 using an S1 interface. The HeNBs 170 communicate using an X2 interface.

FIG. 1B is another way to view the E-UTRAN portion of the system shown in FIG. 1A. In FIG. 1B, a user equipment (UE) 110 is in wireless communication with a wireless network 100 via an associated link 115-1 to 115-N with each HeNB 170-1 to 170-N. The user equipment 110 includes one or more processors 120, one or more memories 125, and one or more transceivers 130 interconnected through one or more buses 127. Each of the one or more transceivers 130 includes a receiver (Rx) and a transmitter (Tx). The one or more transceivers 130 are connected to one or more antennas 128. The one or more memories 125 include computer program code 123. The one or more memories 125 and the computer program code 123 may be configured to, with the one or more processors 120, cause the user equipment 110 to perform one or more of the operations as described herein.

The wireless network 100 includes, in this example, N HeNBs 170, of which 170-1 and 170-N are shown, an HeNB GW 175, and an MME 165. The internal elements of HeNB 170-1 will be described herein, and it is assumed the other HeNBs 170 are similar. The HeNB 170-1 includes one or more processors 150-1, one or more memories 155-1, one or more network interfaces (N/W I/F(s)) 161-1, and one or more transceivers 160-1 interconnected through one or more buses 157-1. Each transceiver 160-1 includes a receiver, Rx, and a transmitter, Tx. The one or more transceivers 160-1 are connected to one or more antennas 158-1. The one or more memories 155-1 include computer program code 153-1. The one or more memories 155-1 and the computer program code 153-1 may be configured to, with the one or more processors 150-1, cause the HeNB 170-1 to perform one or more of the operations as described herein. The one or more network interfaces 161-1 communicate over networks such as the network 173. The network 173 may implement an X2 interface.

The HeNB GW 175 includes one or more processors 180, one or more memories 195, and one or more network interfaces (N/W I/F(s)) 191 interconnected through one or more buses 187. The one or more memories 195 include computer program code 197. The one or more memories 195 and the computer program code 197 may be configured to, with the one or more processors 180, cause the HeNB GW to perform one or more of the operations as described herein. The one or more network interfaces 191 communicate over networks such as the networks 177, 176. The networks 177, 176 may implement an S1 interface. As defined in 3GPP TS 36.300 V11.1.0 (2012-03), the HeNBGW function includes relaying UE-associated S1 application part messages between the MME serving the UE and the HeNB serving the UE. Hence, using the functionality hosted in the HeNBGW, the HeNBGW is able to identify the HeNB which is last visited by the UE (e.g.: using a mapping of S1 specific UE identifier and the HeNB identifier which was received in the INITIAL UE MESSAGE received from the HeNB).

The MME 165 includes one or more processors 140, one or more memories 145, and one or more network interfaces 141, interconnected via one or more buses 166. The one or more memories 145 include computer program code 147. The one or more memories 145 and the computer program code 147 may be configured to, with the one or more processors 180, cause the MME 165 to perform one or more of the operations as described herein. The one or more network interfaces 141 communicate over networks such as the network 176.

The reference 174 is used to indicate the EPC (evolved packet core), which only comprises in this example the MME 165. However, it is noted that the network 100 shown is merely exemplary. There could be many other entities in the network, such as an OAM (operations and maintenance) entity, a PDN (packet data network) entity, and the like.

The computer readable memories 145, 155, and 195 may be of any type suitable to the local technical environment and may be implemented using any suitable data storage technology, such as semiconductor based memory devices, flash memory, magnetic memory devices and systems, optical memory devices and systems, fixed memory and removable memory. The processors 140, 150, and 180 may be of any type suitable to the local technical environment, and may include one or more of general purpose computers, special purpose computers, microprocessors, digital signal processors (DSPs), application-specific integrated circuits (ASICs), other integrated circuits (ICs), and processors based on a multi-core processor architecture, as non-limiting examples.

The examples herein use an HeNB as an example. The instant invention is applicable to, e.g., LTE small cells, such as LTE access points which provide small coverage, eg: HeNBs, LTE Relay Nodes, or LTE small cell clusters. An LTE small cell is a cell that implements LTE standards.

Figure 2:
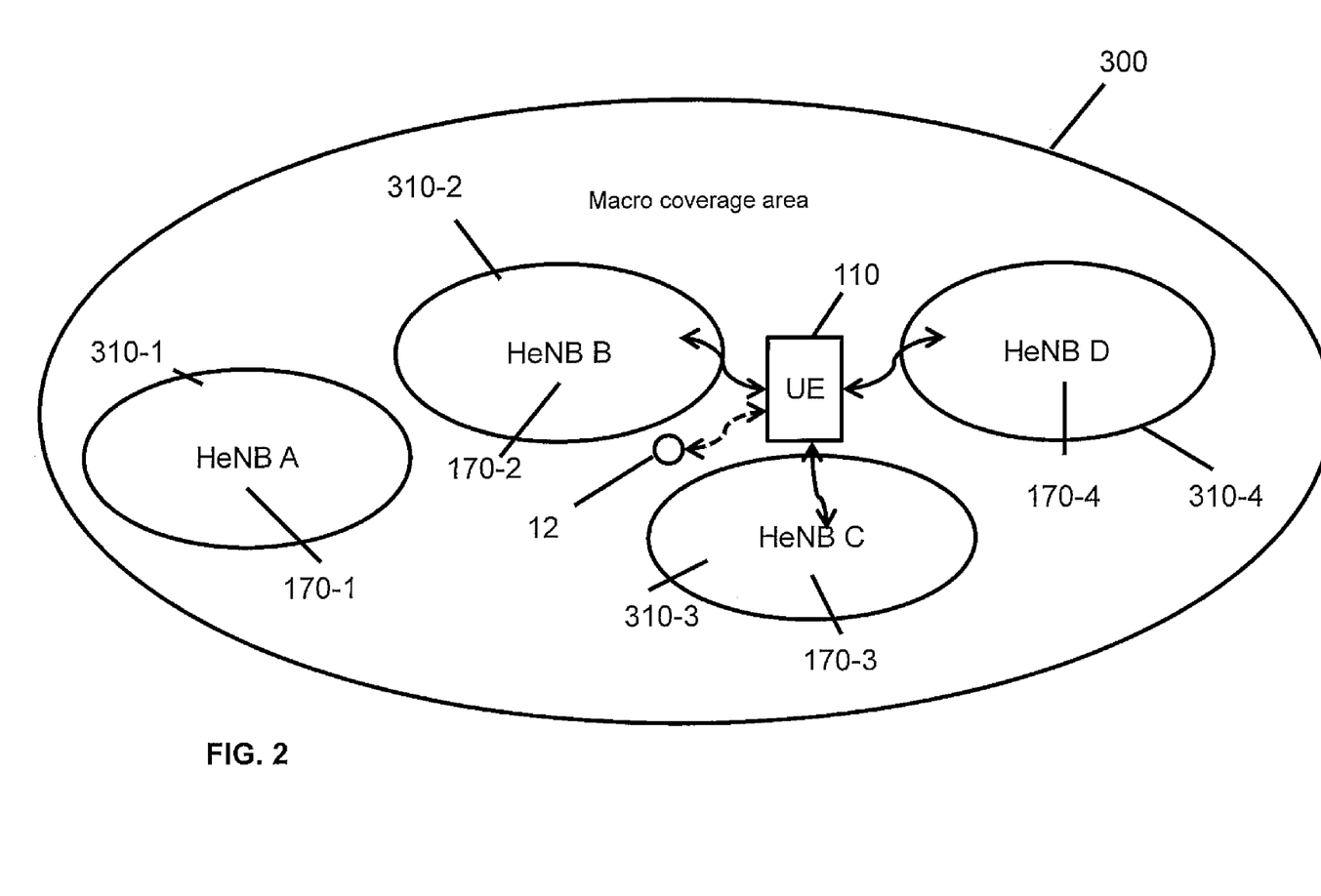
FIG. 2 is an example of a macro cell having multiple HeNBs within the macro cell.

One example of an HeNB deployment scenario (e.g., a femto network) is depicted in FIG. 2. Within the large, overlying coverage area 300 of one macro eNodeB 12, there are altogether four smaller, underlying coverage areas 310-1 through 310-4 covered by four HeNBs 170-1 through 170-4, respectively. In the example of FIG. 2, the UE 110 can communicate with the HeNBs 170-2, 170-3, and 170-4 and potentially the eNB 12. This figure is merely for ease of reference and there could be many more HeNBs 170 per eNB 12. For instance, one eNB 12 might cover multiple city blocks, but there could many HeNBs 170 to cover, e.g., businesses (or parts of businesses), homes, and the like.

Now that exemplary systems have been described, problems with femto networks are now described in further detail. An HeNB is defined in 3GPP TS 22.220. It is defined as "A HeNB is a Customer-premises equipment that connects a 3GPP UE over EUTRAN wireless air interface to a mobile operator's network using a broadband IP backhaul". See section 3.1 of 3GPP TS 22.220 V11.5.0 (2012-06), for instance. The main differences between an HeNB and a macro eNB which apply to the instant disclosure include the following:

1) The HeNB is a customer-premises equipment whereas the macro eNB is not. Hence, the coverage area (as illustrated in FIG. 2, described below) of the HeNB is much smaller than the coverage area of a macro eNB. It should be noted that "customer" in this context is the customer of a mobile operator. This will result in typically a large number of HeNBs 1710 under an MME 165 when compares to the macro eNB scenario.

2) The HeNB 170 provides services either only to a Closed Subscriber Group (CSG) or to other mobile subscribers (in addition to the CSG) too.

3) Connectivity from HeNB to EPC may be via an HeNB GW.

Although HeNBs are used as the primary examples herein, the exemplary embodiments may also be applicable to other small cells for LTE coverage, such as "LTE femto" cells, "LTE pico" cells, or LTE small cell clusters, which may or may not be customer-premises equipment. The terms "femto", "pico", "micro" and the like provide an indication of the corresponding LTE coverage area, from very small (e.g., 50 yards, about 46 meters) for femto, to larger (e.g., 250 yards, about 229 meters) for pico, and even larger for micro. However, these terms and coverage areas are not standardized, so a "pico" cell for on operator may be a "femto" cell for another operator. The networks described herein will be referred to as "femto" networks for ease of reference, but this is not intended to be a limitation on the exemplary embodiments. Similarly, although HeNBGW is used as the primary example herein, the exemplary embodiment may also be applicable to other LTE small cell concentrators (eg: Donor ENB, please refer Figure 4.7.2-1: Overall E-UTRAN Architecture supporting RNs and section 4.7 in 3GPP TS 36.300 V11.1.0).

Concerning additional problems with femto networks, when a UE under a femto Access Point (AP) (e.g., an HeNB 170) is in idle mode and the network 100 needs to page the UE 110, the paging message is sent from the MME 165 to the HeNBGW based on the TAI list or CSG ID list. The femto APs which are members of a TAT list or CSG ID list are made known to the HeNB GW 175 on S1 setup. There could be multiple femto APs which are part of this list. An HeNB GW 175 has no mechanism to optimize or minimize the number of HeNBs which are paged.

Due to this, when a paging message is received by the HeNB GW 175 from the MME, the HeNB GW 175 will be forced to, as per the current mechanisms, send the paging message to all HeNBs within same TAT list or CSG ID list mentioned in the message. This will result in increase of processing load on both the HeNB GW 175 and all the HeNBs 170 in addition to increased signaling traffic on the network 100. Hence, there is a need to optimize the number of HeNBs involved in paging a UE.

Typically in a femto system, the number of access points (e.g., HeNBs 170) that are part of the same TAI List area will be many times larger compared to the number of eNodeBs 12, hence the load generated will be many times the load that is currently faced in a macro network. The number of HeNBs which are assigned the same tracking area identity determine the frequency of tracking area updates performed by the UE and the number of HeNBs involved when paging a UE. The operators need to perform a tradeoff between the frequency of tracking area updates performed by the UE 110 versus the number of HeNBs 170 included in a TA (i.e., HeNBs 170 involved in paging a UE).

In the case of an LTE femto network, e.g., as illustrated by FIG. 1B, there is no provision to exchange the IMSI between the UE 110 and an HeNB 170 using RRC procedures. Furthermore, the LTE core network 174 may not provide IMSI in a paging message. This prevents the LTE HeNB GW 175 from creating a mapping of IMSI to HeNB and using the mapping for paging optimization using existing procedures. It is noted that IMSI may be provided by an LTE network in a paging message. See section 5.6.2.2.2 in 3GPP TS 24.301 V10.8.0 (2012-09). However, this section states that "Paging for EPS services using IMSI is an abnormal procedure used for error recovery in the network."

The 3GPP specification for LTE also mentions that if CSG IDs are included in the paging message then the HeNBGW may use the CSG IDs for paging optimization. See section 4.6.2 of 3GPP TS 36.300 V10.7.0 (2012-03), where it states the following: "A list of CSG IDs may be included in the PAGING message. If included, the HeNB GW may use the list of CSG IDs for paging optimization." This is applicable in the case of closed or hybrid femto cells only. In addition, the paging optimization realized will be limited by the number of HeNBs in the list of CSG IDs which is paged. That is, in an enterprise scenario, mostly all users will share the membership of the CSGs managed by the enterprise; hence while paging an enterprise CSG, a large number of HeNBs can still be involved. Regarding CSGs, refer to 3GPP TS 23.060 (3GPP TS 23.060 V11.3.0 (2012-09)) section 5.3.9, which describes CSG functions, and to 3GPP TR 21.905 (3GPP TR 21.905 V11.1.0 (2012-06)) for the following definitions:

"CSG cell: A cell, part of the PLMN, broadcasting a specific CSG Identity. A CSG cell is accessible by the members of the closed subscribers group for that CSG Identity. All the CSG cells sharing the same identity are identifiable as a single group."

"CSG Identity (CSGID): An identity broadcast by a CSG cell or cells and used by the UE to facilitate access for authorised members of the associated Closed Subscriber Group."

By contrast with the problems presented above, instant exemplary embodiments define a mechanism for optimizing the number of paging messages in a femto network by maintaining a mapping in the HeNB GW 175 between, e.g., the IMSI of the UE 110 and the last visited HeNB 175. An amenability group is defined of an MME 165 and an HeNB GW 175, where the MME 165 knows whether the HeNB GW 175 is amenable to paging optimization. If the MME 165 knows that the HeNB GW 175 is amenable to paging optimization, the MME 165 adds the IMSI of the UE 110 in the first downlink UE related S1AP message. The HeNB GW 175 needs to create or update a mapping between the IMSI and the corresponding HeNB ID for that UE. If the MME 165 knows that the HeNBGW is amenable to paging optimization, the MME 165 adds IMSI to the paging message from MME to HeNBGW in addition to UE identity exposed to the radio access link (e.g., link 115). When LTE paging is received at the HeNB GW, the HeNB GW 175 can use IMSI-to-HeNB ID mapping to send the paging message to the corresponding HeNB and its neighbors. Thus, in this approach, the problem of the HeNB GW 175 being forced to flood all HeNBs 170 with the paging message within same TAI or CSG ID mentioned in the message is solved. The HeNB GW 175 will remove the IMSI from the paging message received from the MME before sending the paging message to the selected HeNBs, hence the HeNBs receive a standard paging message and the user confidentiality requirement is met.

Figure 3:
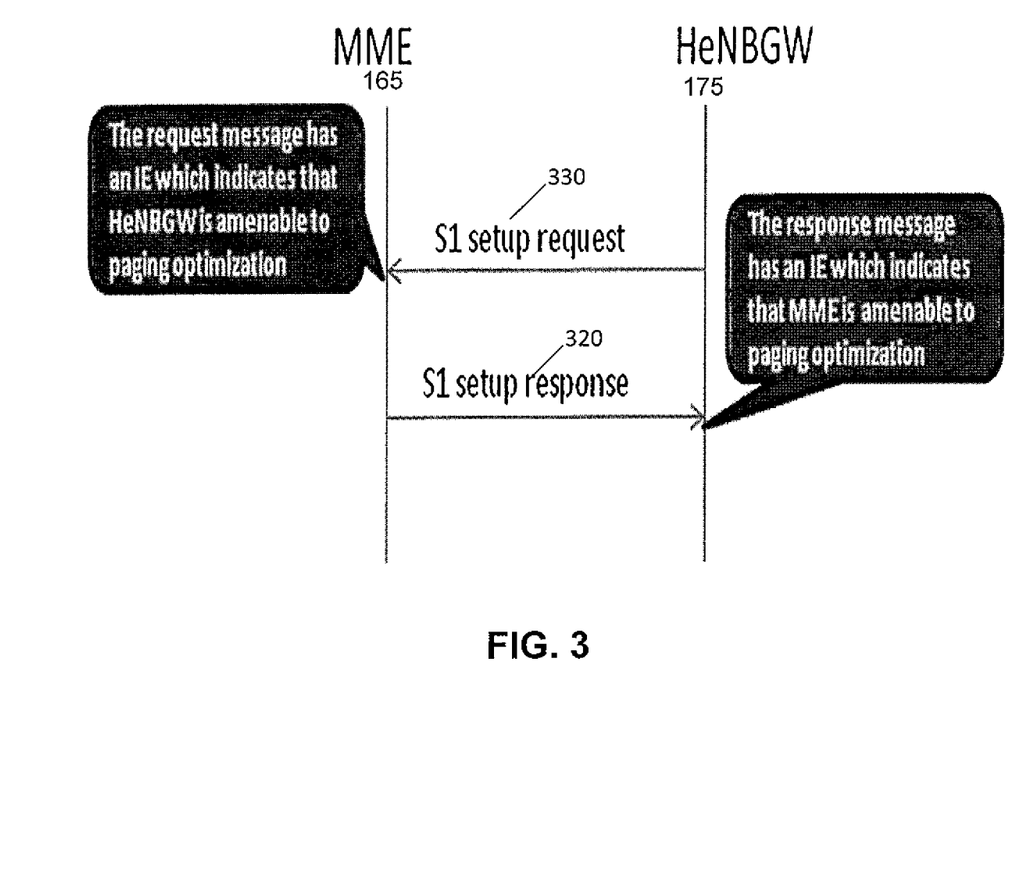
FIG. 3 is an exemplary method, including signaling, illustrating operations performed on or between an MME and an HeNB GW for set up using an S1 interface.

The HeNB GW 175 uses standard mechanisms (e.g., TAI and CSG ID) to arrive at a list of HeNBs 170 to be paged for a UE 110 and then uses the additional mechanisms provided herein to further optimize this list. The MME 165 and HeNB GW 175 will know that the peer entity is amenable to paging optimization based on the OAM configuration or by overloading existing attributes in the S1 setup message (e.g., based on eNB name). For instance FIG. 3 is an exemplary method, including signaling, illustrating operations performed on or between an MME and an HeNB GW for set up using an S1 interface. In this example, the HeNB GW (shown as HeNBGW in this and other figures) 175 sends an S1 setup request message 330 to the MME 165. The message 330 has an IE which indicates that the HeNBGW is amenable to paging optimization. It is noted that the MME may determine the HeNB GW is amenable to paging optimization in other ways, such as OAM configurations such as command line, configuration file or graphical user interface based interface where an operator specifies this capability. There could also be other dynamic ways of discovering this capability (e.g.: DNS based). The MME 165 responds with an S1 setup response message 320 that has an IE which indicates the MME 165 is amenable to paging optimization. It is noted that if the MME 165 can determine through techniques (e.g., means) such as OAM configurations the HeNB GW is amenable to paging optimization, the S1 setup response message 320 (or some other message) can still indicate that the MME 165 is amenable to paging optimization.

The HeNBGW 175 will not use the paging optimization mechanism as per the exemplary embodiments herein under the following conditions but will use standardized paging mechanism as per current 3GPP specifications:

1) The MME or HeNBGW is not amenable to paging optimization.

2) During paging, the MME sends only S-TMSI.

3) If IMSI-to-HeNB ID mapping is not available at the HeNB GW.

If the MME 165 knows that the HeNB GW 175 is amenable to paging optimization, the MME 165 adds IMSI of the UE in the first downlink UE related S1AP message (e.g., downlink NAS transport message)/S1AP Handover Request from MME to HeNBGW/Path Switch Request Ack (acknowledge) from the MME to the HeNB-GW. At this point, the HeNB GW needs to create a mapping between the IMSI and the corresponding HeNB ID for that UE. If a mapping already exists for that IMSI, the value of HeNB ID is updated for that mapping.

Figure 4:
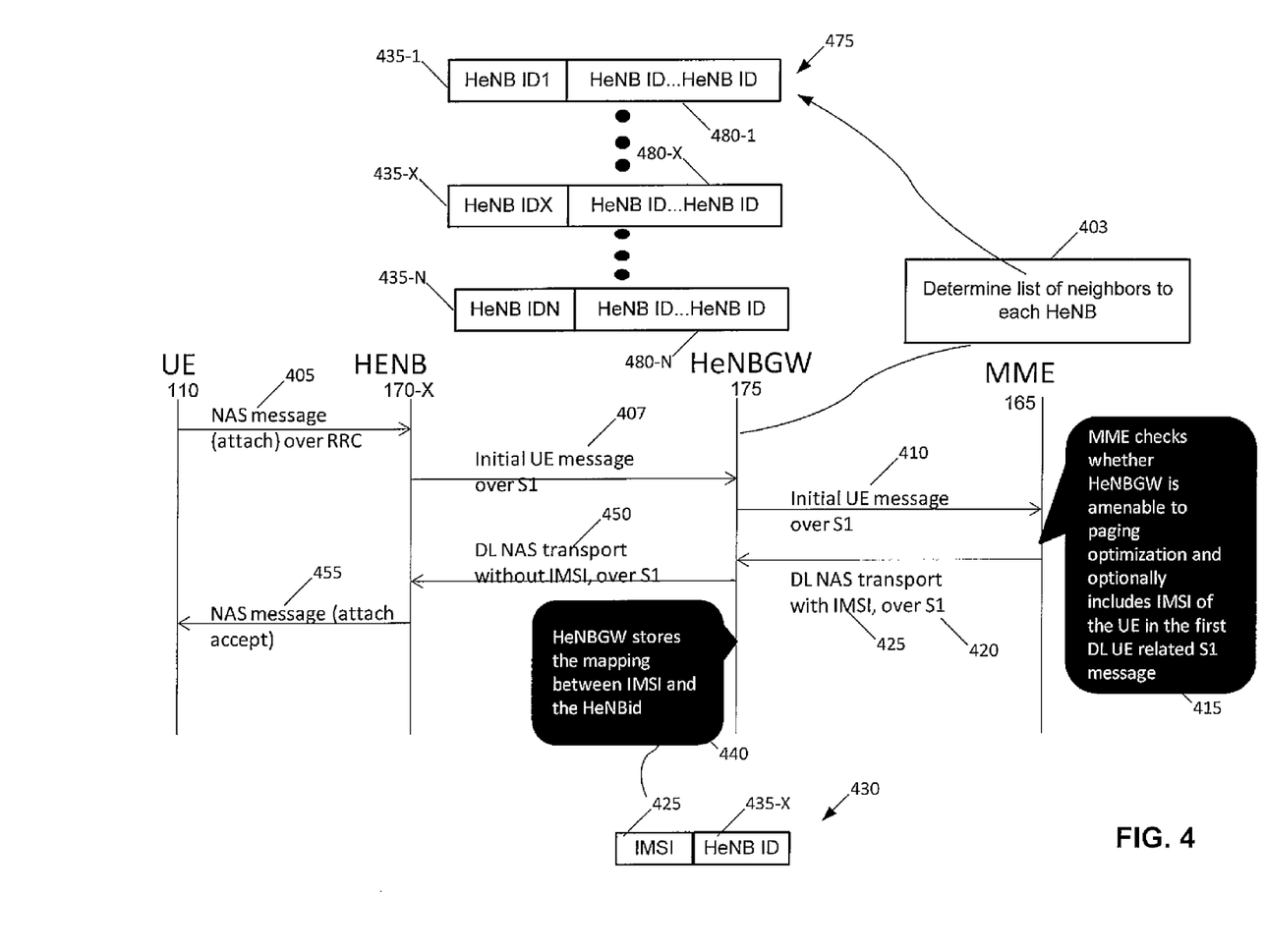
FIG. 4 is an exemplary method, including signaling, illustrating operations performed on or between an MME and an HeNB GW for (and prior to) initial set up for a UE.

FIG. 4 illustrates an example of this concept. FIG. 4 is an exemplary method, including signaling, illustrating operations performed on or between an MME 165 and an HeNB GW 175 for (and prior to) initial set up for a UE. In block 403, the HeNB GW will determine and keep a list of neighbors of each HeNB 170 connected to the HeNB GW 175. An example of a list 475 is shown where each HeNB ID 435-1 to 435-N is associated with a corresponding set 480 of neighbor HeNB IDs. Each set 480 could have zero or more entries. Neighbors could be configured by operator using static or other discovery mechanisms. This determination of neighbors can be based on scanned results or using similar OAM mechanisms. In this example, the UE 110 is currently connected to HeNB 175-X, which has an ID 435-X and a set 480-X of neighbors.

A UE 110 sends a NAS message 403 (e.g., indicating attach) over RRC to an HeNB 170, which in this example is HeNB 170-X. The HeNB 170-X subsequently sends an Initial UE message 407, e.g., over an S1 interface to the HeNB GW 175. The HeNB GW 175 sends an Initial UE message 410 to the MME 165. The MME 165 checks (block 415) whether the HeNB GW is amenable to optimization and optionally (e.g., if the HeNB GW is amenable to optimization) includes the IMSI 425 of the UE in the first DL UE related S1 message. In this example this is message 420, the DL NAS transport message, with the IMSI 425. In block 440, the HeNB GW 175 stores the mapping 430 between the IMSI 425 and an HeNB ID 435-X, which is an ID corresponding to one (HeNB 170-X) of the N HeNBs 170 in FIG. 1. The mapping 430 may also include the set 480-X of neighbors, if desired. When a subsequent paging message is to be sent toward the user equipment, the HeNB ID 435-X indicates an HeNB 170-X last visited by the UE. The HeNB GW 175 sends a DL NAS transport message 450, without IMSI 425, over the S1 interface to the HeNB 170-X. The HeNB 170-X sends a NAS message 455 (e.g., indicating attach accept).

In an exemplary embodiment, the mapping of IMSI-to-HeNB ID shall be cleared in the HeNBGW under the following circumstances:

1) Expiry of configurable timer (a timer is started when UE goes to idle). The UE is no longer connected to the HeNB upon entering idle, and therefore it is assumed if the UE does not reconnect within the time period defined by the timer, the position of UE 110 is no longer known, and the conventional technique of sending the page to all HeNBs is used.

2) Upon sending a first paging message to the HeNB. This assumes the first paging (to the UE from the HeNB) will either succeed or fail. If the first paging fails, the failure is likely due to the UE 110 not being within the coverage area of the HeNB, and therefore the conventional technique of sending the page to all HeNBs is used.

3) Upon a handover scenario to another LTE cell outside the control of HeNBGW, with respect to the HeNB GW. Upon handover completion, the UE 110 is no longer accessible by the original HeNB GW.

Figure 5:
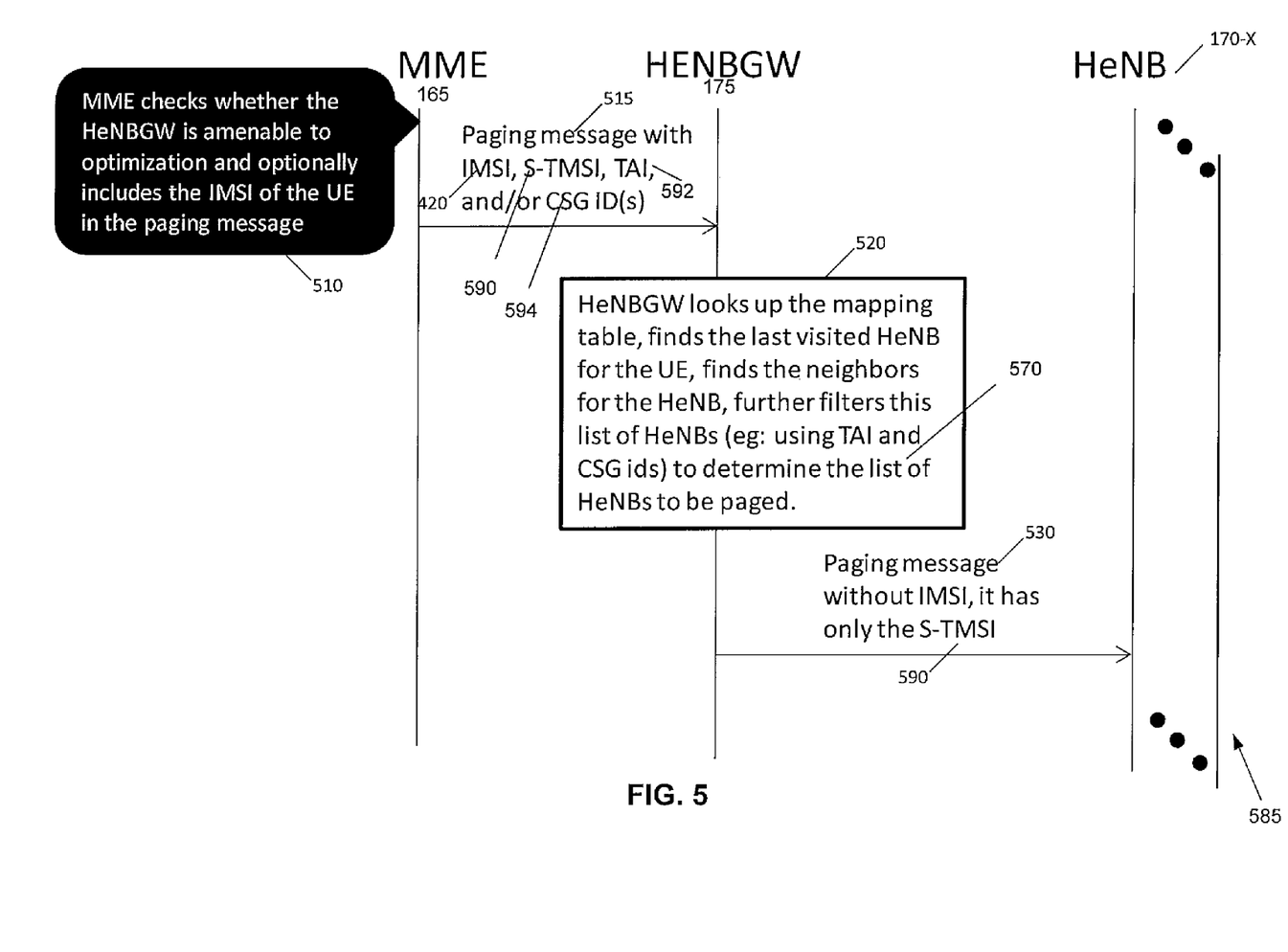
FIG. 5 is an exemplary method, including signaling, illustrating operations performed on or between an MME, an HeNB GW, and an HeNB for paging a UE.

Turning to FIG. 5, this figure is an exemplary method, including signaling, illustrating operations performed on or between an MME, an HeNB GW, and an HeNB for paging a UE. If the MME 165 determines (block 510) that a check indicates the HeNB GW 175 is amenable to paging optimization, the MME 165 optionally adds (block 510) the IMSI 420 to the paging message 515 from the MME to HeNB GW 175 in addition to a UE identity (e.g., S-TMSI 590) allowed to be exposed to the radio access link. The paging message 515 includes one or both of one or more TAIs 592 and one or more CSG ID(s) 594.

When the LTE paging message 515 is received at the HeNB GW 175, the HeNB GW 175 uses the IMSI-to-HeNB ID mapping 430 to send the paging message to the corresponding HeNB 170-X and its neighbors (indicated by reference 585, where the neighbors correspond to the set 480-X of HeNB IDs) which match the TAI(s) 592 and CSG ID(s) 594 obtained from MME in the paging message. More particularly, upon receiving a paging message from the MME, in block 520, the HeNG GW 175 looks up the mapping (e.g., table) 495, finds the last visited HeNB (e.g., HeNB 170-x as indicated by the HeNB ID 435-X) for the UE 110 using the mapping table 495, finds a list of the neighbor HeNBs using the mapping table 495 as indicated by the set 480-X of neighbors, and further filters this list of HeNBs, e.g., using TAI(s) 592 and/or CSG ID(s) 594, to determine a list 570 of HeNBs that will be paged for a particular UE.

Figure 6:
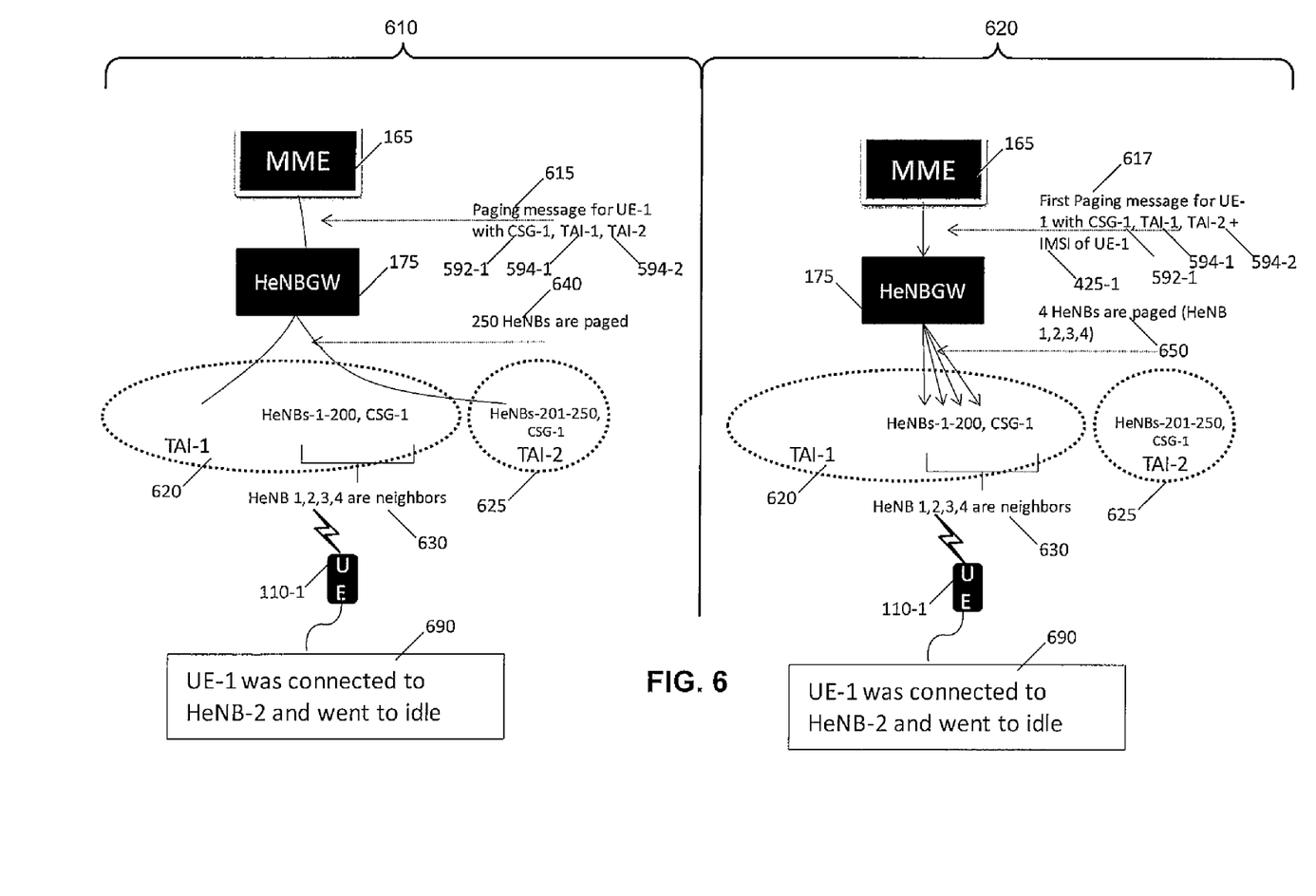
FIG. 6 is an example illustrating reduction in paging between conventional paging techniques and paging techniques used in an exemplary embodiment herein.

The order in which operations are performed in block 520 occurs for the following exemplary reasons. An "intermediate" list obtained using the last visited HeNB and its neighbors may contain HeNBs with other TAI/CSG than the TAI/CSG in the paging message 515. These HeNBs with other TAI/CSG should not be paged, because the MME 165 is already specifying the TAI/CSG to be paged. Thus, a final filter using the TAI(s) 592 and/or CSG(s) 594 is applied to the intermediate list to determine the final list 570. A further point of description is that it is possible to apply a first filter using the TAI(s) 592 and/or the CSG(s) 594, and then apply additional filters using the last visited HeNB and its neighbors. However, as illustrated in FIG. 6, there could be many HeNBs indicated by the TAI(s) 592 and/or the CSG(s) 594, which means a search process to find the last visited HeNB and its neighbors could take much longer than would a search process that starts with the last visited HeNB and its neighbors and then applies the TAI(s) 592 and/or the CSG(s) 594 to that potentially much smaller set of HeNBs.

It can be seen that the HeNB GW 175 can reduce the number of page messages sent to HeNBs 170 from the number of HeNBs in the list 495 to a single page message for the HeNB 170-X and page messages (if any) for the set 480-X of neighbor HeNBs. An example of the possible reduction is more particularly illustrated by FIG. 6, described below.

If the paging message 515 received at the HeNB GW 175 from the MME includes a temporary identity (e.g., S-TMSI 590) which satisfies the user confidentiality requirement in addition to the IMSI 420, the HeNB GW 175 will consider this as a case where user confidentiality has to be observed and hence the HeNB GW will remove the IMSI from the paging message 515 received before sending a revised paging message 530 to the selected HeNBs 170.

If the paging message 515 received at the HeNB GW from the MME 165 does not include any temporary identity (e.g.: S-TMSI 590) which satisfies the user confidentiality requirement but contains only the IMSI 420, the HeNB GW 175 will consider this as a case where user confidentiality need not be observed (e.g., network failure) and hence the HeNB GW will not modify the paging message 515 received before sending the paging message 515 to the selected HeNBs 170.

Upon receiving a second paging message from the MME 165 for the same IMSI 420, the HeNB GW will send a paging message to all HeNBs with matching TAI and CSG IDs present in the paging message without using paging optimization mentioned above. This will happen because the IMSI-to-HeNB ID mapping 430 is cleared during the first paging, for reasons explained above.

In this approach, the problem of the HeNB GW 175 being forced to flood all HeNBs 170 with the paging message within same TAI or CSG ID mentioned in the message is solved. FIG. 6 is an example illustrating reduction in paging between conventional paging techniques and paging techniques used in an exemplary embodiment herein. FIG. 6 shows a paging example 610 with conventional techniques and a paging example 620 with an exemplary embodiment herein. In these examples, the UE-1 (i.e., UE 110-1) was connected to HeNB-2 and went to idle (see block 690).

For paging example 610, the paging message 615 is for UE-1 (i.e., UE 110-1) and includes CSG-1 592-1, TAI-1 594-1, and TAI-2 594-2. Reference 620 indicates that there are 200 HeNBs for CSG-1 and TAI-1, and reference 625 indicates that there are 50 HeNBs for CSG-1 and TAI-2. Reference 630 indicates that HeNBs 1, 2, 3, and 4 are neighbors. As indicated by reference 640, 250 HeNBs are paged in paging example 610.

By contrast, with a first paging message 617 that contains the IMSI of UE-1 (i.e., UE 110-1), the HeNB GW 175 using an exemplary embodiment herein would only page four HeNBs as indicated by reference 650: HeNB 2 and its neighbors 1, 3, and 4.

To reiterate, exemplary embodiments herein define a mechanism for optimizing the number of paging messages in a femto network by maintaining a mapping in the HeNB GW between the IMSI of the UE and the last-visited HeNB. This helps in reducing the paging message traffic while not compromising on the user confidentiality requirement. An amenability group of MME and HeNB GW is defined in an exemplary embodiment, where the MME determines whether the HeNBGW is amenable to paging optimization. The enhancements described herein do not require any changes in FAPs (femto access points) and UEs. Exemplary embodiments of the instant invention provide mechanism to optimize paging messages in LTE open FAPs while maintaining a user-confidentiality requirement. This is performed while taking advantage of the femto GW (e.g., HeNB GW 175) deployment. Certain exemplary embodiments are defined based on existing mechanisms and fallback mechanisms are defined under certain conditions (e.g., paging retry).

In terms of product/standards impacts, the interface towards UE and FAP will remain unchanged. For non-optimized paging, the interfaces between the MME and HeNB GW can be backward compatible. For paging optimization, the interface between the MME and the HeNBGW may have the following exemplary, non-exhaustive, and non-limiting changes.

1) Changes to the first UE DL S1AP messages from MME to HeNB GW such as:
   a) Initial context setup request;
   b) S1 Handover Request;
   c) Path switch request acknowledge;
   d) The first Downlink NAS transport message can include IMSI information. This IMSI is used to form the mapping table (IMSI-to-HeNB ID) in the HeNB GW.

2) Changes to Paging S1AP message so that there is a provision for the MME to include both IMSI and S-TMSI when sending the message to the HeNBGW. For instance, an optional Information element "IMSI" may be added in the S1AP Paging.

Embodiments of the present invention may be implemented in software (executed by one or more processors), hardware (e.g., an application specific integrated circuit), or a combination of software and hardware. In an example embodiment, the software (e.g., application logic, an instruction set) is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted, e.g., in FIG. 1B. A computer-readable medium may comprise a computer-readable storage medium (e.g., memory(ies) 155, 195 or other device) that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

The following abbreviations that may be found in the specification and/or the drawing figures are defined as follows:

3GPP Third Generation Partnership Project
AP Access Point
CSG Closed Subscriber Group
DL Downlink
eNB evolved Node B (e.g., LTE base station)
EPC Evolved Packet Core
E-UTRAN Evolved-UMTS Radio Access Network
FAP Femto Access Point
HeNB Home eNB
HNB Home NodeB
HNBAP Home NodeB Application Part
IE Information Element
IMSI International Mobile Subscriber Identity
ID Identity
LTE Long Term Evolution
NAS Non-Access Stratum
OAM Operation And Maintenance
RF Radio Frequency
RN Relay Node
RNC Radio Network Controller
RRC Radio Resource Control
Rx Reception or Receiver
S-GW Serving GateWay
S-TMSI System Architecture Evolution Temporary Mobile Station Identity
TA Tracking Area
TAI Tracking Area Identity
TAU Tracking Area Update
TS Technical Standard
Tx Transmission or Transmitter
UE User Equipment
UMTS Universal Mobile Telecommunications System
V Version

What is claimed is:

1. A method, comprising:
receiving from a core network entity a paging message for a specific user equipment, the paging message comprising a permanent user identity of a user corresponding to the specific user equipment;
determining, using the permanent user identity, a set of small cells to which the paging message should be sent based on a small cell last visited by the specific user equipment and small cells that are neighbors to the last-visited small cell; and
sending the paging message, without the permanent user identity, to the determined set of small cells.

2. The method of claim 1, wherein the permanent user identity is an international mobile subscriber identity.

3. The method of claim 1, wherein the paging message received from the core network comprises a temporary identity and a permanent identity of the specific user equipment, and wherein sending the paging message further comprises sending the paging message, without the permanent user identity but with the temporary identity of the specific user equipment, to the determined set of small cells.

4. The method of claim 3, wherein the temporary identity is a system architecture evolution temporary mobile station identity.

5. The method of claim 1, wherein determining, using the permanent user identity, a set of small cells implementing long-term evolution standards further comprises determining the set of small cells by applying a filter based on one or both of a tracking area identity or the closed subscriber group identity in the paging message to the small cell last visited by the specific user equipment and small cells that are neighbors to the last-visited small cell to remove cells from the small cell last visited by the specific user equipment and small cells that are neighbors to the last-visited small cell and to create the set of small cells.

6. The method of claim 5, wherein while processing a paging message including both the temporary identity and the permanent identity, the determining the set of small cells and the sending the paging message to the determined set of small cells are performed, but wherein while processing a paging message including only the temporary identity and not including the permanent identity, the determining the set of small cells and the sending the paging message to the determined set of small cells are not performed and, instead, sending the paging message to all small cells corresponding to the one or both of a tracking area identity or the closed subscriber group identity in the paging message is performed.

7. The method of claim 5, wherein determining, using the permanent user identity, a set of small cells further comprises determining the set of small cells at least by accessing a mapping between the permanent user identity and the small cell last visited by the specific user equipment.

8. The method of claim 7, wherein in response to the mapping being available the determining the set of home base stations and the sending the paging message to the determined set of home base stations are performed, but wherein in the mapping not being available, the determining the set of home base stations and the sending the paging message to the determined set of home base stations are not performed and, instead, sending the paging message to all small cells corresponding to the one or both of a tracking area identity or the closed subscriber group identity in the paging message is performed.

9. The method of claim 7, wherein:
the small cell last visited by the specific user equipment is a specific small cell from which a message from the specific user equipment is received prior to receiving the paging message; and
the method further comprises, prior to receiving the paging message, creating the mapping between the permanent user identity and the specific small cell in response to sending the message received from the specific user equipment and in response to receiving a downlink message for the specific user equipment and comprising the permanent user identity.

10. The method of claim 9, further comprising updating the mapping in response to receiving a downlink message for the specific user equipment and comprising the permanent user identity and in response to determining that the mapping already exists.

11. The method of claim 9, wherein the method is performed by a gateway and wherein the method further comprises clearing the mapping in response to any of the following circumstances:
expiry of a timer started in response to the specific user equipment going to idle;
upon sending a first paging message to the small cell last visited by the specific user equipment; or
upon handover completion for the specific user equipment with respect to the gateway.

12. The method of claim 1, wherein the method is performed by a gateway, wherein the method further comprises, prior to receiving a downlink message with the permanent user identity, determining in the gateway whether a core network is amenable to paging optimization.

13. The method of claim 1, wherein the paging message with permanent user identity and processing of a downlink message with the permanent user identity are handled and processed only from core network entities that are determined to be amenable to paging optimization.

14. The method of claim 13, wherein it is determined the core network entity is amenable to paging optimization because an indication the core network entity is amenable to paging optimization is received at the gateway in a message or because of an operator configuration indicating this ability.

15. The method of claim 1, wherein the method is performed by a gateway, wherein the gateway is able to access a plurality of small cells, and wherein the method further comprises the gateway determining the neighbors to the last-visited small cells from the plurality of small cells.

16. The method of claim 1, wherein the method is performed by a gateway, wherein the method further comprises, prior to receiving the paging message, sending a message indicating the gateway is amenable to paging optimization.

17. The method of claim 16, wherein sending a message indicating the gateway is amenable to paging optimization further comprises sending an S1 request message comprising an indication the gateway is amenable to paging optimization.

18. The method of claim 17, wherein the S1 request message is an S1 setup request message.

19. The method of claim 1, wherein each of the small cells implements one or more long term evolution standards in order to perform at least one operation performed by the method.

20. A computer program product embodied in a non-transitory computer memory and comprising instructions the execution of which by a processor results in performing operations that comprise: receiving from a core network entity a paging message for a specific user equipment, the paging message comprising a permanent user identity of a user corresponding to the specific user equipment;
determining, using the permanent user identity, a set of small cells to which the paging message should be sent based on a small cell last visited by the specific user equipment and small cells that are neighbors to the last-visited small cell; and
sending the paging message, without the permanent user identity, to the determined set of small cells.

21. The computer program according to claim 20, wherein the computer program is a computer program product comprising a computer-readable medium bearing computer program code embodied therein for use with a computer.

22. An apparatus, comprising: one or more processors; and one or more memories including computer program code, the one or more memories and the computer program code configured, with the one or more processors, to cause the apparatus to perform at least the following:
receive from a core network entity a paging message for a specific user equipment, the paging message comprising a permanent user identity of a user corresponding to the specific user equipment;
determine, using the permanent user identity, a set of small cells to which the paging message should be sent based on a small cell last visited by the specific user equipment and small cells that are neighbors to the last-visited small cell; and
send the paging message, without the permanent user identity, to the determined set of small cells.

\* \* \* \* \*